Patented Jan. 26, 1932

1,843,017

UNITED STATES PATENT OFFICE

CHARLES WILLIAM DOWSETT, OF BWANA M'KUBWA, NORTHERN RHODESIA, ASSIGNOR TO ANGLO AMERICAN CORPORATION OF SOUTH AFRICA, LIMITED, OF JOHANNESBURG, TRANSVAAL, UNION OF SOUTH AFRICA

SOLVENT TREATMENT OF COPPER ORES

No Drawing. Application filed July 20, 1928, Serial No. 294,328, and in Union of South Africa December 7, 1927.

The present invention refers to the extraction of copper from ores and materials containing it, by means of an ammoniacal solvent, for instance a solution of cupric ammonium carbonate.

In practice, this method has been carried out only by gravity leaching; and with that in view the mechanical reduction of the ore has been directed to obtaining a coarse granular product with the minimum of a slime product. Such slime as has been unavoidably made has usually been separated, and treated—if at all—by other means than the ammonia solvent method.

The gravity leaching method nevertheless requires a large plant and gives rise to operating difficulties and loss due to the volatilization of the ammonia from extensive ore surfaces which are difficult adequately to enclose.

On the other hand, sliming methods of treatment have not been applied to the process in question, probably because the sliming methods which have been developed for other kinds of ores and solvents would result in diluting the ammonia solvent to such an extent as seriously to increase the cost of the subsequent heating operation by which the copper is recovered from the enriched solution.

The present invention provides a process of treating copper ores by the ammonia solvent method which can be carried out with apparatus of compact form wherein exposure of the solvent solution is avoided and which avoids undue dilution of the solution.

According to the present invention the cupriferous material is reduced by wet grinding to a slime pulp, that is a pulp of which the greater part is capable of passing a 200 mesh screen.

The pulp is then de-watered, conveniently by filtration; and preferably also by forcing air through the cake formed by the filtering operation.

The de-watered pulp, containing not more than twenty per cent of water, is then treated by means of a suitable ammoniacal solvent, such for instance as a solution of cupric ammonium carbonate.

This treatment may be effected by such means as re-pulping the cake with the solvent solution and re-filtering; but the preferable procedure is to employ a pressure filter for forming the cake and to retain the cake in the filter while forcing the solvent solution through it. This has the advantage that the dissolving operation is effected under pressure, which generally results in a better extraction. Moreover loss of ammonia is minimized owing to the solution being enclosed.

Upon the solvent action being completed the residual solution is displaced by means of air under pressure or a wash liquid or both and the cake is treated with steam to drive off residual ammonia. The impoverished cake is discharged; and the enriched filtrate is treated for the recovery of its copper content by any suitable method such as heating it to cause precipitation of the copper.

I claim:

1. The process of extracting copper from cupriferous material, consisting in sliming the material, de-watering the slime pulp, further de-watering the pulp by forcing air through it, and treating the de-watered pulp with ammoniacal solvent to extract copper therefrom.

2. The process of extracting copper from cupriferous material, consisting in sliming the material, de-watering the slime pulp to a high degree by methods involving the application of pressure to the pulp, and treating the de-watered pulp with ammoniacal solvent under pressure to extract copper therefrom.

3. The process of extracting copper from cupriferous material, consisting in sliming the material, forcing the slime pulp into a pressure filter and thereby forming it as a filter cake and de-watering it, further de-watering the cake by forcing compressed air through it, and thereafter forcing ammoniacal solvent liquor through the cake to dissolve copper therefrom.

In testimony whereof I affix my signature.

C. W. DOWSETT.